(12) United States Patent
Magovern, III (10) Patent No.: US 10,930,182 B2
(45) Date of Patent: Feb. 23, 2021

(54) MODULAR UNIVERSAL LIGHTWEIGHT BANNER DISPLAY SYSTEM FOR AN UNMANNED AERIAL VEHICLE AND METHOD OF USING SAME

(71) Applicant: Sweet Water Media Holdings, LLC, Sewickley, PA (US)

(72) Inventor: George J. Magovern, III, Sewickley, PA (US)

(73) Assignee: SWEET WATER MEDIA HOLDINGS, LLC, Sewickley, PA (US)

(*) Notice: Subject to any disclaimer, the term of this patent is extended or adjusted under 35 U.S.C. 154(b) by 427 days.

(21) Appl. No.: 15/987,369

(22) Filed: May 23, 2018

(65) Prior Publication Data

US 2018/0342184 A1 Nov. 29, 2018

Related U.S. Application Data (60) Provisional application No. 62/509,909, filed on May 23, 2017.

(51) Int. Cl.
| | | |
|---|---|---|
| *G09F 21/12* | (2006.01) | |
| *B64C 39/02* | (2006.01) | |
| *G09F 17/00* | (2006.01) | |

(52) U.S. Cl.
CPC .......... *G09F 21/12* (2013.01); *B64C 39/024* (2013.01); *G09F 17/00* (2013.01); *B64C 2201/024* (2013.01); *B64C 2201/12* (2013.01); *G09F 2017/0041* (2013.01)

(58) Field of Classification Search
CPC ............ G09F 21/12; G09F 2017/0041; G09F 2017/0075; B64C 39/024; B64C 2201/024; B64C 2201/12
See application file for complete search history.

(56) References Cited

U.S. PATENT DOCUMENTS

| 1,308,695 | A | * | 7/1919 | Bushkovski | ............. | A47G 1/08 |
| | | | | | | 40/741 |
| 3,683,530 | A | * | 8/1972 | Robinson | ................ | G09F 21/12 |
| | | | | | | 40/215 |

(Continued)

OTHER PUBLICATIONS http://www.expertdrones.com/drone-events/drone-billboards-a-revolution-in-marketing, Expert Drones, A Dronepire, Inc. Company, 2015.
http://hoovy.co/ Hoovy LLC—Drone Advertising, 2015.

*Primary Examiner* — Gary C Hoge
(74) *Attorney, Agent, or Firm* — Blynn L. Shideler; Krisanne Shideler; BLK Law Group (57) ABSTRACT

A modular universal lightweight unmanned aerial vehicle banner display system includes a carrying case to house the components of the system and can easily accommodate additional elements. The system includes a plurality of tow scaffolds that form a fixed and rigid scaffolding configuration to be coupled to the banner. The system includes a variety of flexible rigging elements, such as nylon lines, configured to form a harness configuration to couple the tow scaffold configuration of one or a collection of assembled tow scaffolds to the unmanned aerial vehicle in single line or double line harness configurations. The system is applicable for a large variety of unmanned aerial vehicles or drones and a large variety of banners.

18 Claims, 7 Drawing Sheets

(56) References Cited

U.S. PATENT DOCUMENTS

| | | | | |
|---|---|---|---|---|
| 4,592,555 | A * | 6/1986 | Bradford | A63B 67/00 |
| | | | | 273/402 |
| 6,557,285 | B2 * | 5/2003 | Walsh, Jr. | G09F 7/18 |
| | | | | 248/328 |
| 10,244,875 | B1 * | 4/2019 | Lydon | G09F 15/0018 |
| 2005/0160648 | A1 * | 7/2005 | Voluckas | G09F 17/00 |
| | | | | 40/617 |
| 2012/0000106 | A1 * | 1/2012 | Wick | G09F 7/18 |
| | | | | 40/606.01 |
| 2017/0355461 | A1 * | 12/2017 | Naito | G05D 1/12 |
| 2018/0047319 | A1 * | 2/2018 | Barba | G09F 19/18 |
| 2018/0165998 | A1 * | 6/2018 | Bogan, III | G09F 21/08 |
| 2018/0281954 | A1 * | 10/2018 | Atchley | G06Q 50/28 |
| 2019/0051224 | A1 * | 2/2019 | Marshall | G03B 21/145 |

* cited by examiner

MODULAR UNIVERSAL LIGHTWEIGHT BANNER DISPLAY SYSTEM FOR AN UNMANNED AERIAL VEHICLE AND METHOD OF USING SAME

RELATED APPLICATIONS

This application claims priority to U.S. provisional patent application Ser. No. 62/509,909 filed May 23, 2017 entitled "Modular Universal Lightweight Unmanned Aerial Vehicle Banner Display System and Method of Using Same" invented by George J. Magovern, III.

BACKGROUND OF THE INVENTION

Field of the Invention

The present invention relates to a modular banner display system for a drone or an unmanned aerial vehicle.

Background Information

A brief review of unmanned aerial vehicles may be relevant for this disclosure. An unmanned aerial vehicle (UAV), commonly known as a drone, is an aircraft without a human pilot aboard. Other phrases are also known to be used such as remotely piloted aerial vehicle (RPAV) and remotely piloted aircraft (RPA). Other similar phrases are also in use. These are all used interchangeably within the scope of the present application.

The uncertain regulatory environment further leads to confusion in the definitions and what is encompassed in different phrases. For example, in October 2015, the US Department of Transportation and FAA indicated a task force would be formed to determine the requirements for registering commercial and non-commercial (hobbyist) drones. As of Dec. 21, 2015, the Federal Aviation Administration requires all owners of model aircraft, small unmanned aircraft or drones, or other RC aircraft weighing between 0.55 and 55 pounds to register online before taking to the skies and failure to register an aircraft can result in civil penalties up to $27,500. Criminal penalties for failure to register can include fines of up to $250,000 under 18 U.S.C. 3571 and/or imprisonment up to three years. However, in May 2017 a federal appeals court shot down the rule requiring hobbyists to register their drones stating that "Statutory interpretation does not get much simpler," the appeals court said in siding with plaintiff John Taylor, a drone hobbyist from Washington, D.C. "The Registration Rule is unlawful as applied to model aircraft." President Trump has apparently reinstated the rule on Dec. 12, 2017 with the signing of the "National Defense Authorization Act" in which a one paragraph section of a massive bill (even by Federal government standards) simply stated that this rule "shall be restored."

UAVs are a component of an unmanned aircraft system (UAS). The phrase unmanned aircraft system (UAS) was adopted by the United States Department of Defense (DOD) and the United States Federal Aviation Administration in 2005 according to their *Unmanned Aircraft System Roadmap* 2005-2030. The International Civil Aviation Organization and the British Civil Aviation Authority have also adopted the phrase. The phrase unmanned aircraft system, which include a drone or UAV, a ground-based controller, and a system of communications between the two, emphasizes the importance of other elements beyond an aircraft itself, including elements such as the ground control stations, data links and other related support equipment. Other terms include an unmanned-aircraft vehicle system (UAVS);

The flight of UAVs may operate with various degrees of autonomy: either under remote control by a human operator or autonomously by onboard computers. Compared to manned aircraft, UAVs were originally used for missions too "dull, dirty or dangerous" for humans. While they originated mostly in military applications, their use is rapidly expanding to commercial, scientific, recreational, agricultural, and other applications, such as policing, peacekeeping, surveillance, marketing, product deliveries (including illicit smuggling), aerial photography, agriculture, and drone racing.

One common marketing approach is for drones to carry banners. Flying advertisements have been around for decades, commonly in the form of blimps (with the fleet of GOODYEAR® brand blimps being the most famous), or small planes that tow banners (a ubiquitous site on east coast beaches). As drone technology gets smaller, cheaper and more accessible, it presents some significant advantages for banner advertisement and also raises safety and privacy concerns.

Drone banner advertising is now an up and coming business opportunity for drone owners. In Canada, during the 2015 federal election campaign, drivers in Victoria saw a drone carrying a banner for a local candidate. In 2106, the company Uber flew a number of small drones over a highway in Mexico City with the drones hovering above the cars carrying signs for UBERPOOl™, the company's carpooling service, and the banners chastised drivers who were in their cars alone and blamed them for Mexico City's infamous smog problem. The company Dronecast, based in Philadelphia, offers banner advertising similar to what Uber did in Mexico City, see the Drone Banner Advertising under the DRONECAST™ brand at https://www.dronecast.com/services/#edge3.

A drone advertising company, sometime called a "Dronevertising company", known as Hoovy developed its own drone, an octocopter called "ADVATAR™" that's specifically designed to carry banner ads. See. http://hoovy.com/ in which their website states "Hoovy is a new, innovative drone advertising marketing platform that uses drones to drive brand awareness. Our mission is to make advertising fun and engaging! Hoovy provides the freedom of movement. Our drones can access many locations and consequently we harbor many double-takes, gawks, photos, and fingers being pointed when we fly. The element of movement makes Hoovy an interactive and engaging platform for brand exposure that captivates and interests onlookers. Hoovy works with each client's individual brand and image to come up with unique and engaging marketing agenda and set them free into the air. Hoovy is innovating Drone technology and advertising all at once. Our goal is to use innovative technology and creative thinking to best put your brand in an optimum position for success, in the sky."

Another advertiser specializing in drones is the company Expert Drones, see http://www.expertdrones.com/drone-events/drone-billboards-a-revolution-in-marketing where the company states that users may "Take your advertising to another level and utilize our customized flying billboard. Expert Drones takes your logo or message and displays it on a banner hanging from the drone. The drone is then preprogrammed with waypoints and automatically will fly a specific route with the banner, or we can simply let it hover in one place over a crowd or concert!"

Drone banner advertising has had some limitations that the advertising companies are making specialized one of a kind adaptors for drones to enable them to carry banners, which is not easily utilized across various drone models. Further, the existing banner carrying adaptors can often interfere with take-off and landing of the drone yielding an increased likelihood of damage to the drone. Further, the existing banner carrying adaptors are often limited to specific banner types and sizes.

With this background it becomes clear that there is a need to provide a modular universal lightweight unmanned aerial vehicle banner display system overcoming the deficiencies of the prior art.

SUMMARY OF THE INVENTION

The present invention addresses the deficiencies of the prior art and provides a modular banner display system for an unmanned aerial vehicle including a plurality of rigid tow scaffolds configured to be selectively coupled together, wherein the system is configured to form a plurality of tow scaffold configurations including configurations of a different quantity of tow scaffolds; and a plurality of flexible rigging elements configured to form a plurality of harness configurations each used to couple a tow scaffold configuration to the unmanned aerial vehicle, wherein the plurality of harness configurations include at least one single line harness configuration and at least one double line harness configurations.

The modular banner display system for an unmanned aerial vehicle according to the present invention provides wherein the system 10 is less than 6 kg, and even less than 2 kg.

The modular banner display system for an unmanned aerial vehicle according to the present invention provides wherein each rigid tow scaffold is a hollow tube. Each rigid tow scaffold may be effectively formed to measure about 12" long and may be effectively formed of one of aluminum or plastic. Each rigid tow scaffold may be provided with a plurality of thru-holes spaced at intervals along a length thereof. The modular banner display system for an unmanned aerial vehicle according to the present invention may be provided wherein the system includes a plurality of eye bolts and eye nuts, each eye bolt configured to be selectively received in any of the thru-holes of each tow scaffold to create coupling rings or eyelets. The modular banner display system for an unmanned aerial vehicle according to the present invention may be provided wherein each rigid tow scaffold includes a threaded post formed by a bushing insert within the tow scaffold at one end, and wherein each rigid tow scaffold includes a threaded insert within the tow scaffold at the opposite end from the threaded post.

The modular banner display system for an unmanned aerial vehicle according to one aspect of the invention may be provided wherein at least three tow scaffolds are provided and at least one tow scaffold configuration includes three coupled tow scaffolds. The modular banner display system for an unmanned aerial vehicle according to one aspect of the invention may be provided wherein the system includes a plurality of eye bolts and eye nuts, each eye bolt configured to be selectively received on each tow scaffold to create coupling rings or eyelets.

The modular banner display system for an unmanned aerial vehicle according to one aspect of the invention may be provided wherein the system includes a plurality of carabiners.

The modular banner display system for an unmanned aerial vehicle according to according to one aspect of the invention may be provided wherein a plurality of the flexible rigging elements are formed of nylon, and wherein at least one flexible rigging element includes a coupling loop at least on one end thereof. The modular banner display system for an unmanned aerial vehicle according to one aspect of the invention may be provided wherein at least one flexible rigging element includes a swivel clip at least on one end thereof. The modular banner display system for an unmanned aerial vehicle according to one aspect of the invention may be provided wherein two identical length flexible rigging element terminate and share a common loop and a common swivel link at one end thereof and have separate loops and swivel links at the opposite ends thereof; and wherein the flexible rigging elements that terminate and share a common loop and a common swivel link at one end thereof further includes a cinch mechanism that is configured to bring the rigging elements together at the cinch mechanism and the wherein the cinch mechanism is adjustable along the length of the rigging elements.

The modular banner display system for an unmanned aerial vehicle according to one aspect of the invention may be provided wherein in each of the plurality of harness configurations an associated tow payload banner being carried is at least 18" from a base of the unmanned aerial vehicle to prevent interference between tow payload and the drone during take-off and landing of the drone. The modular banner display system for an unmanned aerial vehicle according to one aspect of the invention may be provided wherein in at least one of the plurality of harness configurations is about 60" in length.

One aspect of the invention provides a method of using a modular banner display system for an unmanned aerial vehicle comprising the steps of: Providing a plurality of rigid tow scaffolds configured to be selectively coupled together, wherein the system is configured to form a plurality of tow scaffold configurations; Forming one of the plurality of tow scaffold configurations using at least one of the rigid tow scaffolds; Providing a plurality of flexible rigging elements configured to form a plurality of harness configurations each used to couple a tow scaffold configuration to the unmanned aerial vehicle, wherein the plurality of harness configurations include at least one single line harness configuration and at least one double line harness configurations; and Forming one of the plurality of harness configurations using at least one of the flexible rigging elements; and Coupling a banner to an unmanned aerial vehicle using the formed tow scaffold configuration and the formed harness configuration.

These and other advantages are described in the brief description of the preferred embodiments in which like reference numeral represent like elements throughout.

DESCRIPTION OF THE PREFERRED EMBODIMENTS

Figure 2:
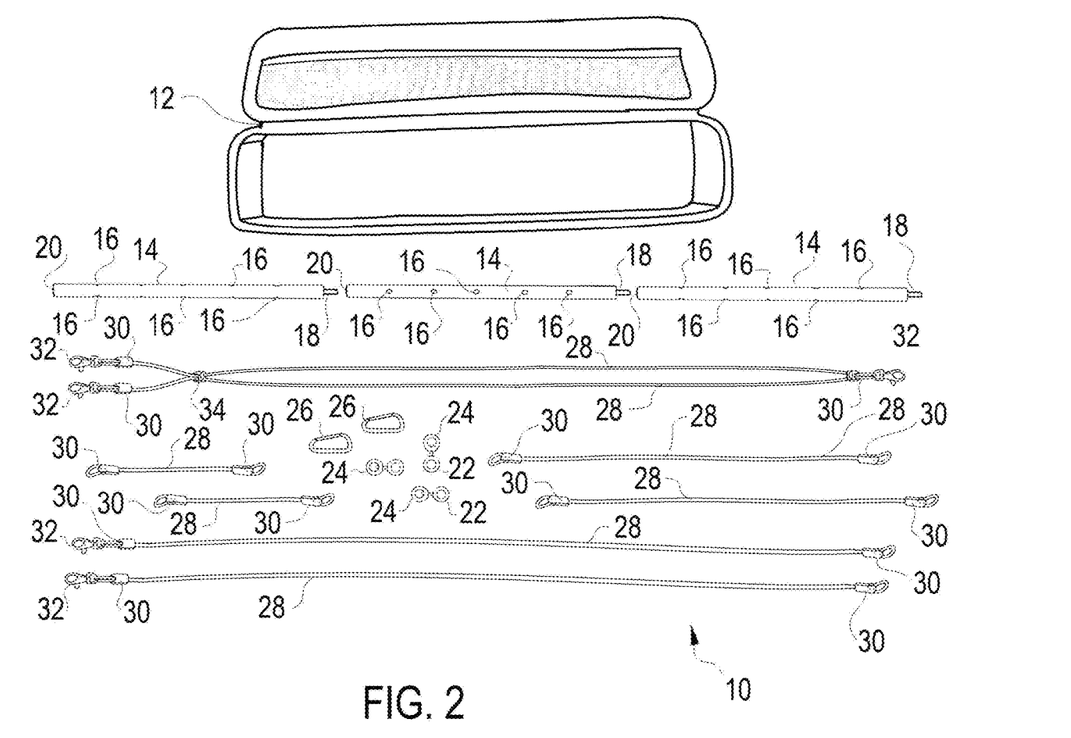
FIG. 2 is a plan view of the components of a modular banner display system for an unmanned aerial vehicle according to one embodiment of the present invention.

The present invention provides a modular universal lightweight unmanned aerial vehicle banner display system 10 for an unmanned aerial vehicle or drone 100, the components of which are shown collectively in FIG. 2. The system 10 includes a carrying case 12 to house the components of the system 10 and can easily accommodate additional elements like added tow scaffolds 14. The system 10 includes a plurality (generally three) of tow scaffolds 14 that form a fixed and rigid scaffolding to be coupled to the banner. The system 10 includes a variety of flexible rigging 28 elements, such as nylon lines, configured to form a harness configuration to couple the tow scaffold 14 (or collection of assembled tow scaffolds 14 known as the tow scaffold configuration) and associated banner 200 to the drone 100.

The system 10 is modular as shown in the figures and can be assembled into numerous configurations. Specifically the tow scaffolds 14 represent modular components that can be coupled together in any number (collectively called a scaffold configuration) to accommodate the particular width of the banner 200, as discussed below. The rigging 28 length in any particular harness configuration is also modular.

The system 10 is universal in two respects, first that it can be coupled to substantially any available drone 100, and second that it can be coupled to substantially any available banner 200. The weight of the banner 200 that may be coupled to a drone 100 by the system 10 is generally governed by the lifting capacity of the drone 100. The system 10 is lightweight, generally (excluding the case 12) less than 6 kg, preferably less than 4 kg, more preferably less than 3 kg, and optionally less than 2 kg, and thus suitable for a wide variety of available drones 100.

As noted above the system 10 includes a plurality of tow scaffolds 14 that form a fixed and rigid scaffold configuration from which a banner 200 (or flag) can be towed for optimal display and safety in drone advertising applications.

Each tow scaffold 14 is a hollow aluminum or plastic tube which measures 12" long and has thru-holes 16 spaced in 2" intervals. Other materials are possible but high strength, light weight, and low cost represent the design factors.

The tow scaffolds 14 include a threaded post 18 formed by a bushing insert within the tow scaffold 14 at one end. The tow scaffolds 14 include a threaded insert 20 a bushing insert within the tow scaffold 14 at the opposite end. Three tow scaffolds 14 can be joined together with a threaded post 18 threaded into a threaded insert 20 of an adjacent tow scaffold 14 to form a 36" combined length scaffold configuration, or two of the three tow scaffolds 14 can be similarly joined together to form a 24" combined length scaffold configuration, or a single tow scaffold 14 may form a 12" length scaffold configuration. The collection of possible scaffold configuration lengths can accommodate a wide range of tow payloads or banner 200 types. The system 10 can include more than three tow scaffolds 14.

The coupling and decoupling of adjacent tow scaffolds 14 is easily accomplished by holding one tow scaffold 14 and manually rotating the adjacent tow scaffold to thread or unthread the threaded post 18 into or out of a threaded insert 20 of an adjacent tow scaffold 14. Unequal lengths for the three (or more) tow scaffolds 14 are possible in the system 10 to create a wider variety of length combinations in the configurations with three or more tow scaffolds 14, but using the same length for each tow scaffold 14 keeps manufacturing costs to a minimum and the available lengths are generally sufficient. For example a 22" banner can easily be accommodated with a 24" scaffold configuration or assembly (two coupled tow scaffolds 14).

The system 10 includes a plurality of eye bolts 22 and eye nuts 24, generally at least three, which are configured to be received in any of the thru-holes 16 of each tow scaffold 14 to create coupling rings or eyelets for coupling either the banner 200 or the harness configuration formed by rigging 28. The eye bolts 22 and eye nuts 24 will generally be metal, but could be high strength plastic. Specifically, the eye bolt 22 extends through the thru-hole 16 with the eye nut 24 threaded to the eye bolt 22 on an opposed side of the tow scaffold 14. The eye bolts 22 and eye nuts 24 should have threads equivalent to the threads of the threaded post 18 and the threaded insert 20 of the tow scaffolds 14, whereby one eye bolt 22 may be coupled to the threaded insert 20 of one tow scaffold 14 at the end of the assembled scaffold configuration and one eye nut 24 may be coupled to the threaded post 18 of one tow scaffold 14 at the opposed end of the assembled scaffold configuration for end eyelets. The eye bolts 22 and eye nuts 24 at the opposed ends of the assembled scaffold configuration also allow for attaching the banner 200 to the scaffold configuration and/or the scaffold configuration to the harness configuration. The eye bolts 22 and eye nuts 24 thus serve various connector and fastener roles along the entire length and at the ends of the scaffold configuration in operation of the system 10.

The system 10 includes a pair of carabiners 26, which are a specialized shackle or metal loop typically with a spring loaded gate used to quickly and reversibly connect components together. The carabiners 26 will typically be utilized in situations where the tow payload or banner 200 has grommets 210 and the carabiners 26 can easily couple the scaffold configuration of the system 10 to the banner 200 through the grommets 210 and appropriately positioned eye bolts 22 and eye nuts 24 on the scaffold configuration as shown, for example in FIG. 1.

The system 10 includes a variety of flexible rigging 28 elements, formed by nylon lines or ropes, and configured to form a harness configuration to couple the assembled scaffold configuration of scaffold(s) 14 to the drone 100. Bright colors for the flexible rigging 28 elements helps the operator see the rigging 28 in use to determine if there is an undesirable tangling of the lines that needs attention.

A variety of flexible rigging 28 elements are provided in the system 10 of the invention to yield a variety of harness configurations for the system 10. Some flexible rigging 28 element have coupling loops 30 at opposed ends to facilitate coupling. The flexible rigging 28 elements can be divided into main harness components which add swivel clips 32 at least at one end thereof and connector rigging elements that end in the coupling loops 30.

One main harness component design includes a flexible rigging 28 element that begins with a first swivel clip or link 32 on a coupling loop 30 at one end of the harness and extends down to a second coupling loop 30 and associated swivel clip 32 at an opposed end of the harness and then the flexible rigging 28 element extends back to the one end terminating at a third swivel clip 32 on a coupling loop 30 whereby the first and third swivel clips 32 are at one end of the harness. The substantially similar harness design can be formed as two identical length flexible rigging 28 elements that terminate and share the same loop 30 and swivel link 32 at one end thereof and have separate loops 30 and links 32 at the opposite end thereof. This harness design further includes a cinch mechanism 34 that is configured to bring the rigging elements 28 (or two portions of the same rigging 28 element if only one is used) together at the cinch mechanism 34 and the mechanism 34 is adjustable along the length of the rigging elements 28.

One main harness component design includes two separate flexible rigging 28 elements each of which begins with a first swivel clip 32 on a coupling loop 30 at one end of the harness and extends down to a second coupling loop 30 and may include an associated swivel clip 32 at an opposed end of the harness.

The main harness components may be of any length, although main harness component lengths of about 60" are preferred. The goal is to provide that the rigid scaffold configuration of assembled scaffold(s) 14 and associated tow payload or banner 200 being carried is at least 18", preferably at least 24" and more preferably at least 36" from the base of the drone 100 (AKA the landing gear of the drone 100) to prevent interference between tow payload (banner 200) and the drone 100 during take-off and landing of the drone 100. The system 10 permits safe landing because the single line harness, double line harness as shown herein, and tow scaffold/payload don't create imbalance with the drone's landing gear. Additionally, because of the length of the harness, the tow scaffold and tow payload don't interfere with the quadcopter rotors and blades. If the tow scaffold or tow payload were affixed directly, or sufficiently close (less than 18" or so), to the landing gear, then they could create interference with the rotors and blades as well. Although the lift generated by the drone 100 will naturally push the tow scaffold/payload away from the landing gear and rotors/blades, with insufficient distance between the rotors/blades and tow payload, that pushing effect creates volatility and could actually cause the tow payload to interfere with the rotors/blades (e.g., tangling). This type of interference could (and likely would) cause the drone 100 to crash and/or fail to execute a safe landing. With no distance between the landing gear and the tow scaffold/payload, as found in some prior art single usage banner carrying designs, the tow scaffold can interfere with the landing gear and the tow payload can interfere with the rotors/blades. The present system 10 essentially eliminates or greatly alleviates these concerns.

The 60" preferable length provides a greater separation between the drone 100 and the banner 200 further allowing flexibility in banner 200 control at take-off and landing (e.g., the banner 200 can be easily manually untangled after the drone 100 has become stable and airborne prior to lifting of the banner 200 completely). The 60" preferable length provides a greater visible separation between the drone 100 and the banner 200 in flight creating dual focal points of the drone 100 and the banner 200 such that the banner message is more effective. The 60" preferable length provides these advantages without adding excessive weight due to excessive length or limiting drone movement due to excessive length. Other lengths are possible with 48"-72" seeming optimal for all of the reasons discussed herein.

The system 10 allows for numerous harness configurations for numerous sized banners 200 as shown in the associated figures. As shown in the figures, the main harness components combine to form two distinct classes of harness arrangements, namely at least the double line harness configurations and the single line harness configurations.

The first to be described is the double line harness configurations and is where two separate main harness flexible elements 28 extend from the drone 100 to the scaffold configuration of assembled scaffold(s) 14 and generally to the edges thereof. Specifically in the double line harness configuration within the meaning of this application the forces supporting and controlling the banner 200 extend along two distinct and spaced lines entirely from the scaffold configuration of assembled scaffold(s) 14 to the drone 100. The double line configuration harness component design includes two separate flexible rigging 28 elements each of which begins with a first swivel clip 32 on a coupling loop 30 at one end of the harness coupled to the drone and extends down to a second coupling loop 30 and may include an associated swivel clip 32 at the opposed end of the harness.

Figure 3:
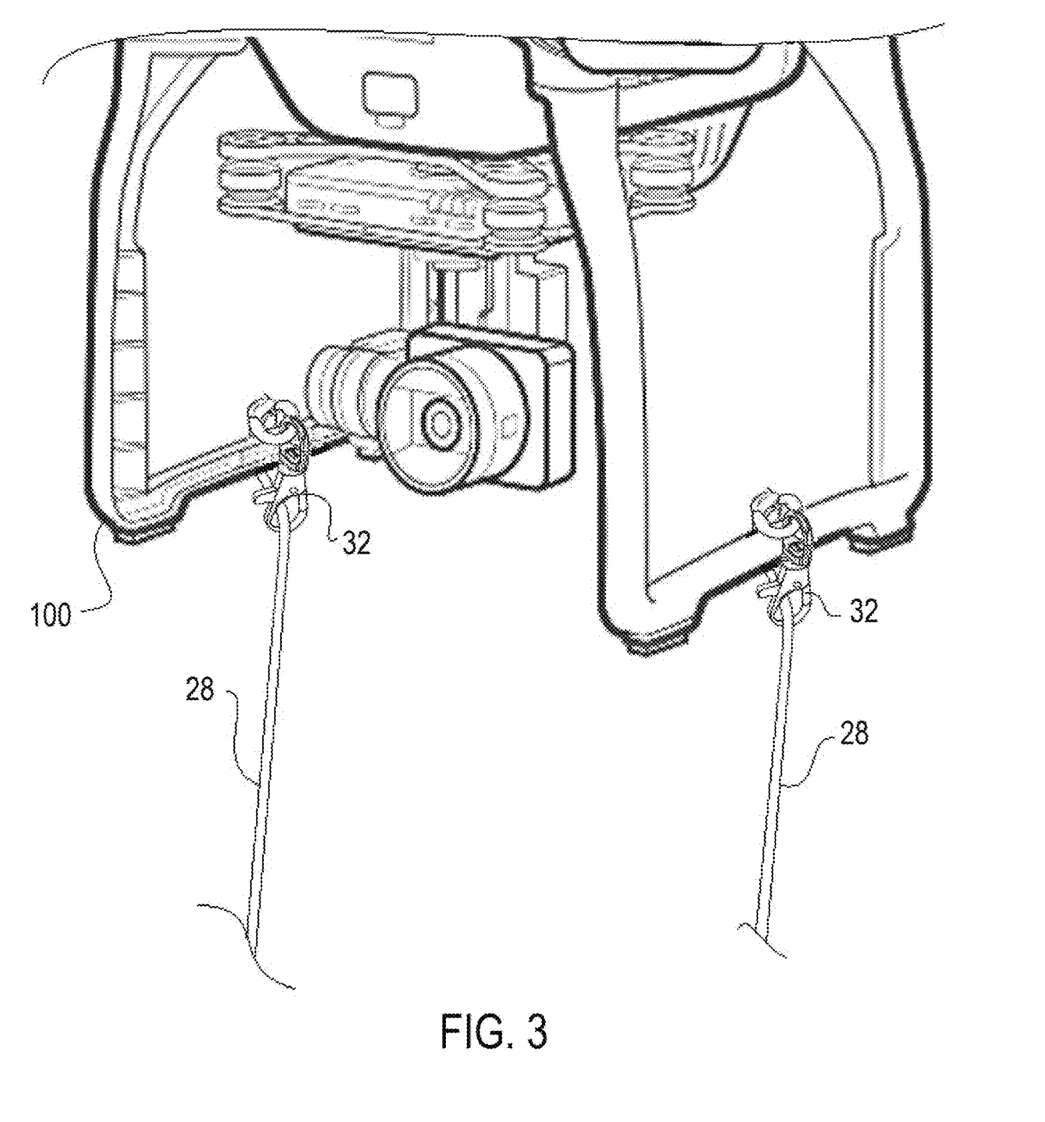
FIG. 3 is a schematic illustration of one representative drone attachment of one double line harness configuration of the modular banner display system according to one embodiment of the present invention.

If the drone has two sides, as the one in FIG. 3 than each the swivel link 32 can easily wrap around one side thereof and clip around the associated element 28 as shown best in FIG. 3 to provide the coupling in the. The flexible element 28 with clip 32 allows for easy attachment to almost any drone configuration. Many drones will provide one or more clip points for attaching the clips 32 directly without the self clipping attachment as shown. The design of the flexible element with loops 30 and swivel clips 32 allow for attachment to essentially any drone configuration in an easy fashion.

Figure 4:
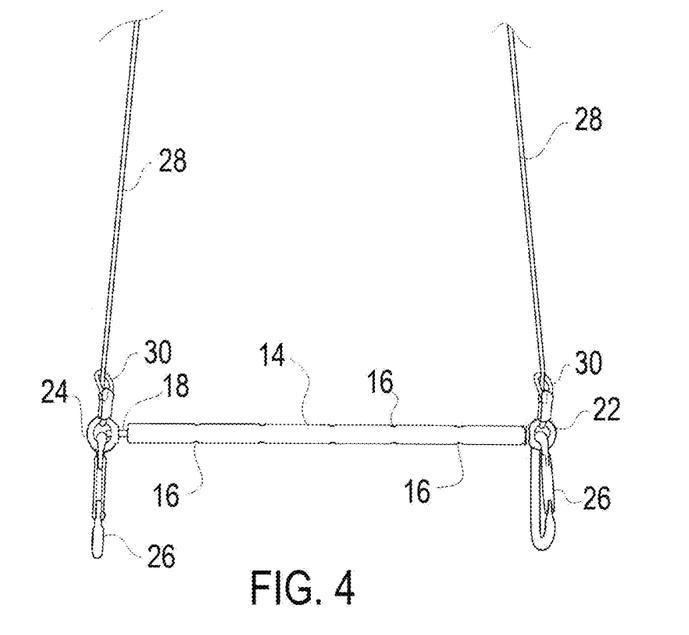
FIG. 4 is a schematic illustration of one representative scaffold configuration using a single scaffold and using one double line harness configuration of the modular banner display system according to one embodiment of the present invention.
Figure 5:
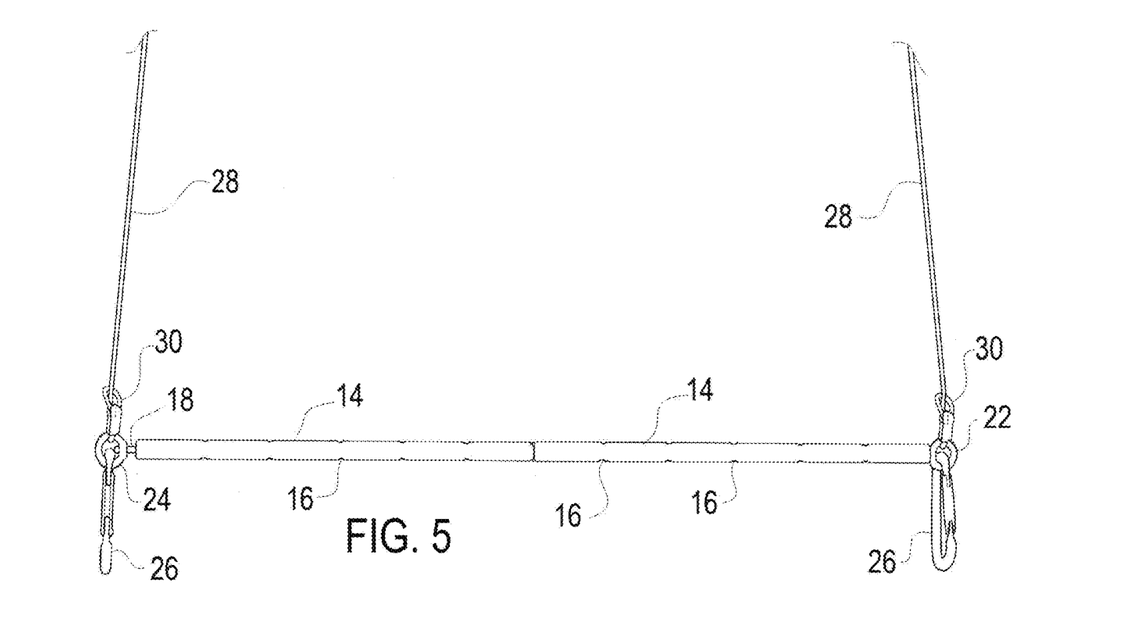
FIG. 5 is a schematic illustration of one representative scaffold configuration using two coupled scaffolds and using one double line harness configuration of the modular banner display system according to one embodiment of the present invention.
Figure 6:
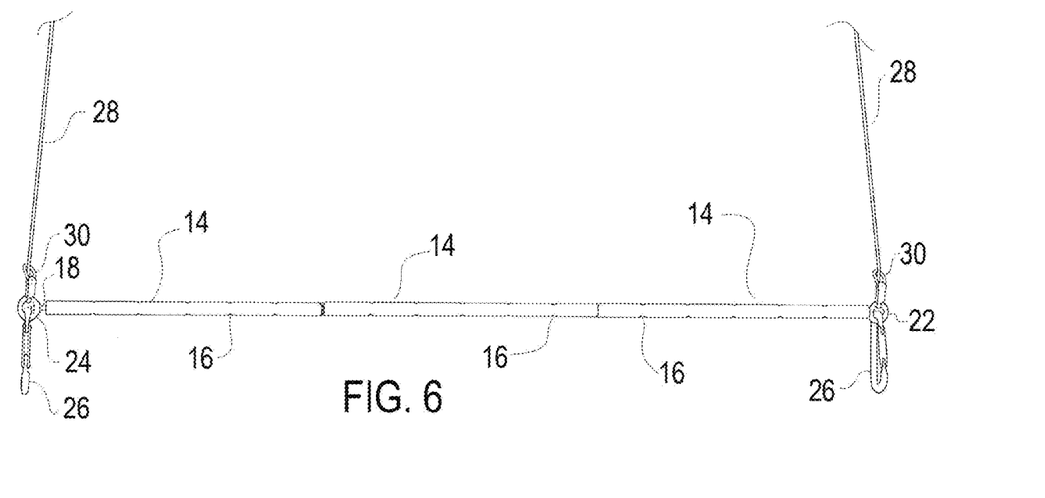
FIG. 6 is a schematic illustration of one representative scaffold configuration using three coupled scaffolds and using one double line harness configuration of the modular banner display system according to one embodiment of the present invention.

In the harness design with two separated main harness flexible elements 28 extending from the drone to the edges of the scaffold the loop 30 at the scaffold end can extend through the eye nut 24 or eye bolt 22 at opposed ends of the scaffold as shown in FIGS. 4-6. FIG. 4 is a schematic illustration of one representative scaffold configuration using a single scaffold 14 and using one double line harness configuration of the modular banner display system 10 according to one embodiment of the present invention; FIG. 5 is a schematic illustration of one representative scaffold configuration using two coupled scaffolds 14 and using one double line harness configuration of the modular banner display system 10 according to one embodiment of the present invention; and FIG. 6 is a schematic illustration of one representative scaffold configuration using three coupled scaffolds 14 and using one double line harness configuration of the modular banner display system according to one embodiment of the present invention. The two separated lines of the double line harness configuration yields greater manuverability to the banner 200, but at a cost of increase drag and thus shorter battery life for the flight of the drone. The double line harness configuration is preferred where control of the rotational orientation of the banner 200 is more significant, such as where the banner 200 needs to be flipped to an opposite time at select times or facing desired directions at select times. The two separated lines of the double harness configuration is suitable for any length of scaffold configuration as shown schematically in FIGS. 4-6.

Figure 1:
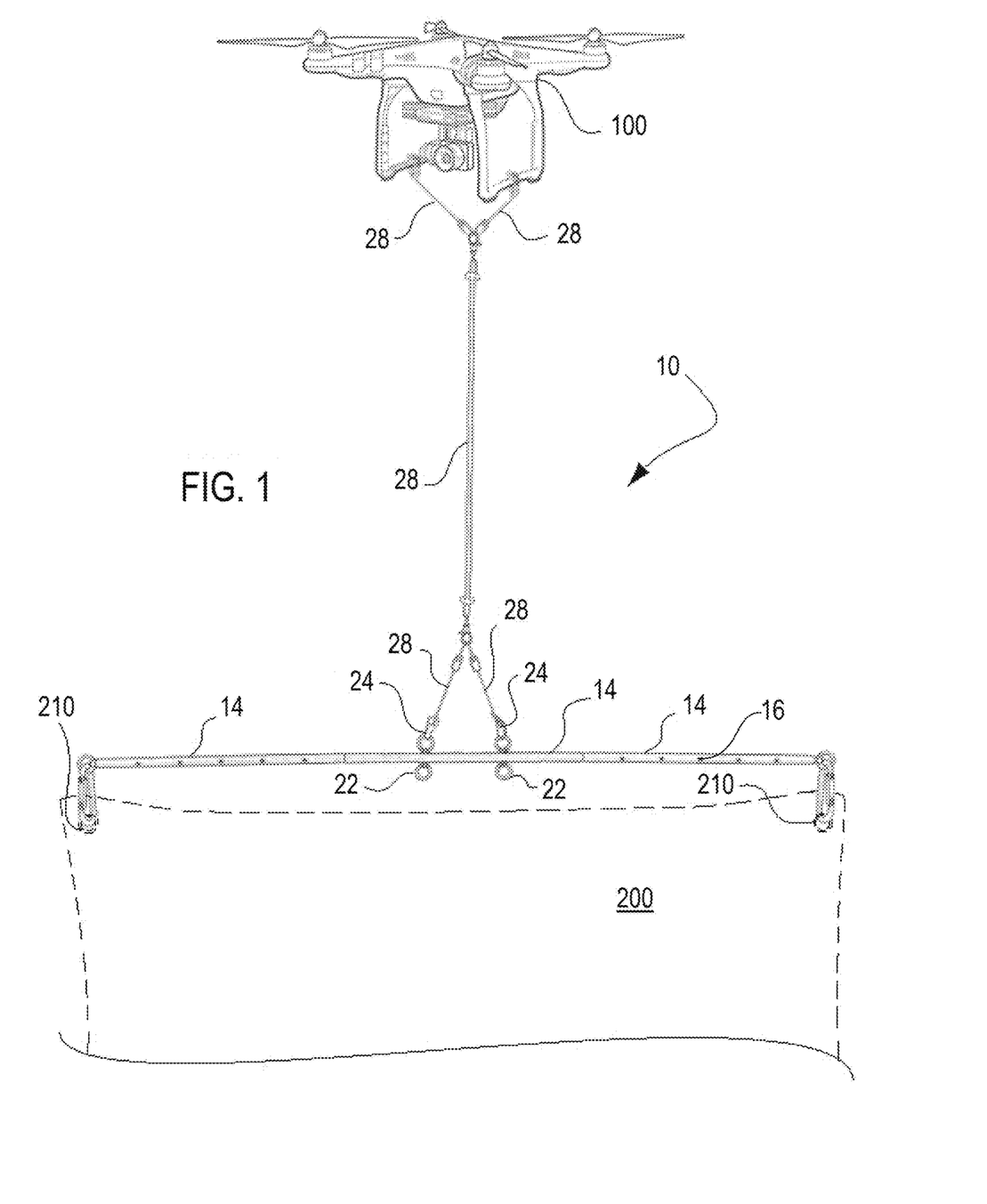
FIG. 1 is a schematic elevation view of an unmanned aerial vehicle using a modular banner display system according to one embodiment of the present invention carrying a banner (shown in part)
Figure 7:
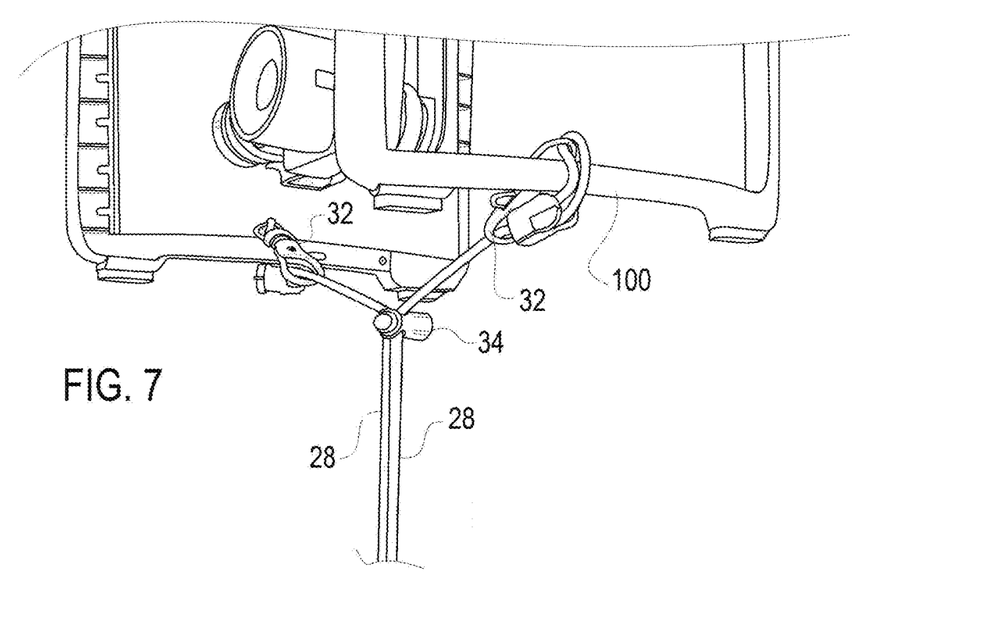
FIG. 7 is a schematic illustration of one representative drone attachment of one single line harness configuration of the modular banner display system according to one embodiment of the present invention.
Figures 8, 9:
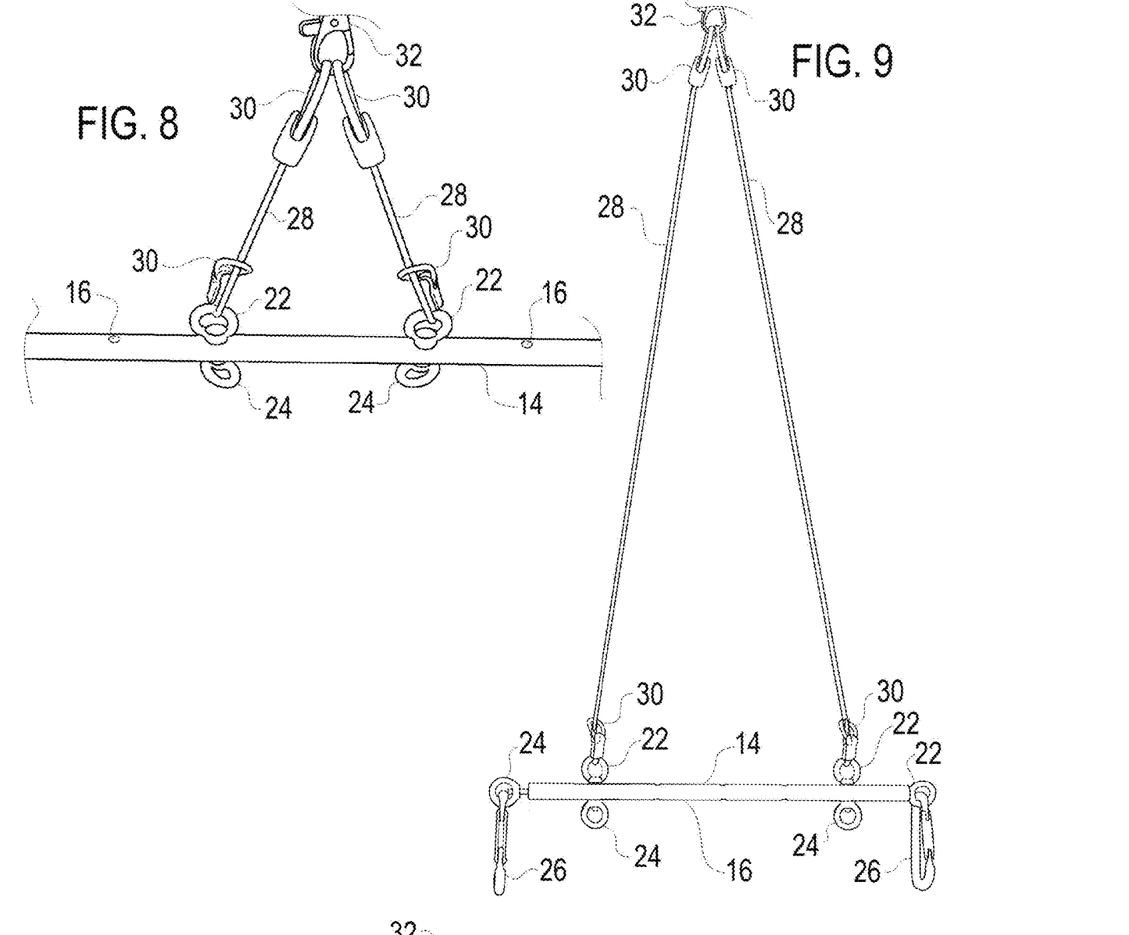
FIG. 8 is an enlarged schematic illustration of scaffold configuration coupling of a single line harness configuration of the modular banner display system according to one embodiment of the present invention.
FIGS. 9-13 are schematic illustrations of scaffold configuration couplings of a single line harness configuration of the modular banner display system according to different embodiments of the present invention.
Figure 10:
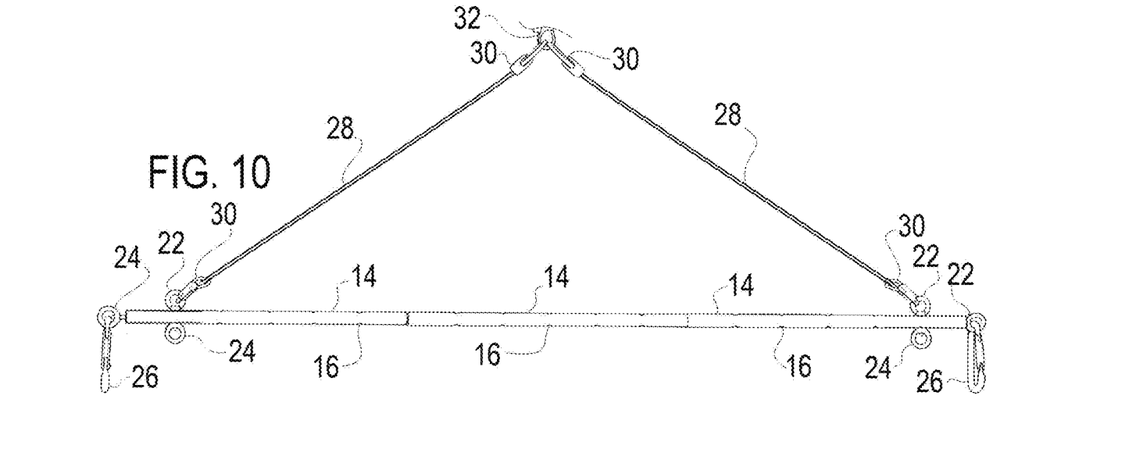

The second class of main harness design provides that the flexible rigging elements extend substantially along a single line from at least a portion if not a majority of the distance from the drone 100 to the scaffold configuration of the assembled scaffold(s) 14. Specifically in the single line harness configuration within the meaning of this application the forces supporting and controlling the banner 200 extend along a single line (which may be formed of two or more rigging elements 28) for at least a portion from the scaffold configuration of assembled scaffold(s) 14 to the drone 100. This single line harness configuration is shown in FIG. 1 and may utilize two identical length flexible rigging 28 elements that terminate and share the same loop 30 and swivel link 32 at the scaffold/banner end thereof and have separate loops 30 and links 32 at the opposite drone end thereof (or one element 28 that doubles back to the drone 100 end). This version of the single line harness design further includes a cinch mechanism 34 that is configured to bring the rigging elements 28 (or two portions of the same rigging 28 element if only one doubled up element 28 is used) together at the cinch mechanism 34 and the mechanism 34 is adjustable along the length of the rigging elements 28. The swivel clip 32 at the base of the single line main harness design allows the tow payload or banner to revolve in a 360 degree range, which tends to limits tow payload control. However, this configuration tends to improve UAS battery efficiency, because the swivel clip 32 generally reduces drag in the overall configuration relative to the double line rigging configuration. Utilization of the single line harness configuration is recommended during less stable or challenging operating conditions, whether due to weather, complex anticipated UAS maneuvers, or demanding tow payloads.

Where the drone has two sides, as the one in the figures than each the swivel link 32 can easily wrap around one side thereof and clip around the associated element 28 as shown in FIG. 7 to provide the coupling. As discussed above, the flexible element 28 with clip 32 allows for easy attachment to almost any drone configuration. Many drones will provide one or more clip points for attaching the clips 32 directly without the self clipping attachment as shown. The design of the flexible element with loops 30 and swivel clips 32 allow for attachment to essentially any drone configuration in an easy fashion. What differentiates this class of harness configuration from the initial double line design is the cinch 34 brings the lines 28 together to effectively form a single line. After attachment of the clips 32 the cinch 34 may be advanced toward the drone 100 to move the location where the flexible elements 28 form a single line closer to the drone 100 as shown in FIG. 7.

Figures 11, 12, 13, 14:
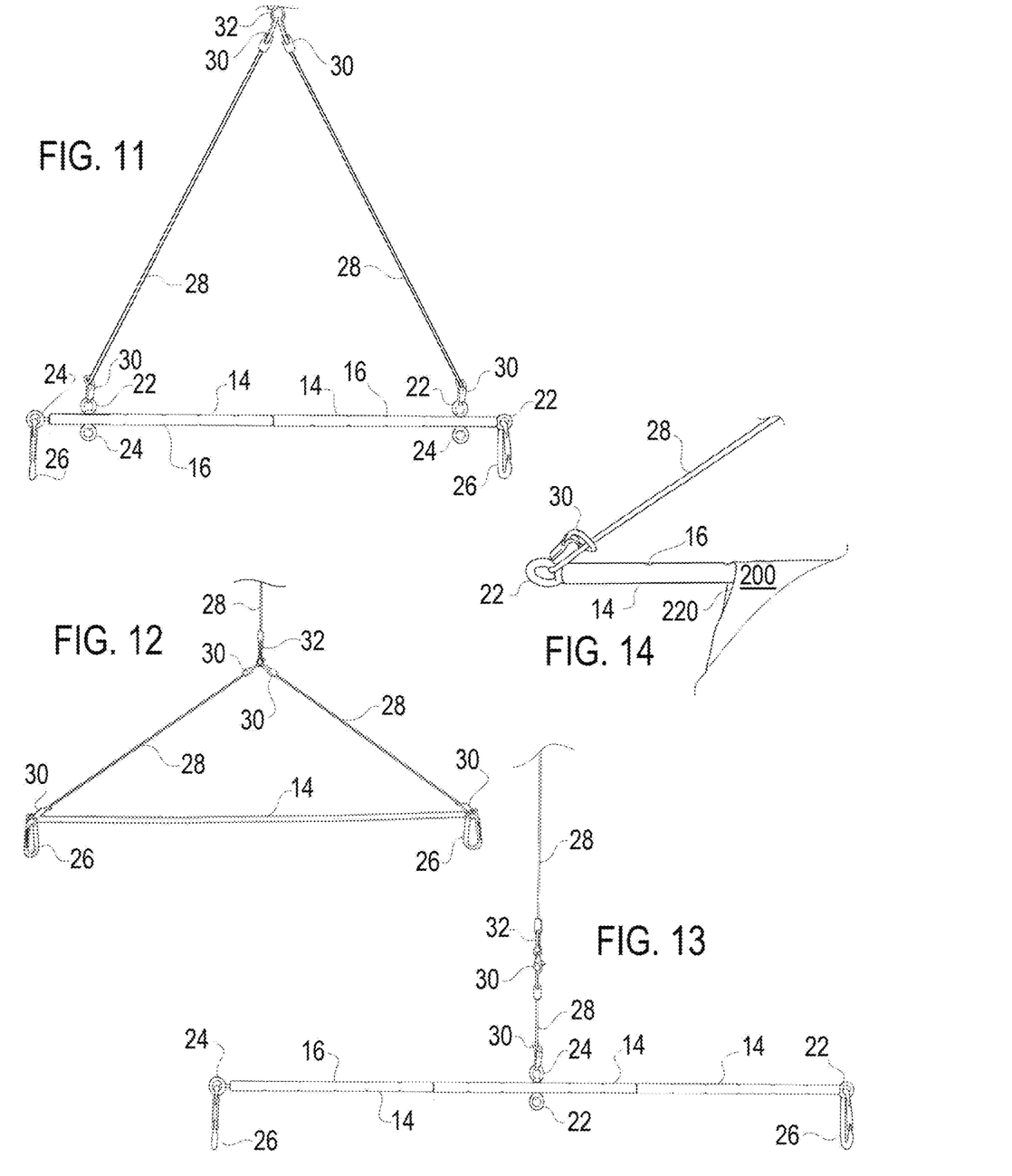
FIG. 14 schematically shows a scaffold and banner coupling of the modular banner display system according to one embodiment of the present invention.

The lower end of this harness design may be coupled to the scaffold configuration in a number of desired configurations such as using two connector elements extending from a swivel link 32 to spaced eye nuts 24 and bolts 22 in the scaffold configuration as shown in various manners in FIGS. 8-12, or a single connector element of a single centrally located eye bolt 22 of FIG. 13.

The scaffold formed by tow scaffolds 14 need not only clip onto grommets 210 in the flag or banner 200 as many banners 200 include an integral end sleeve 220 that can receive the scaffold directly as schematically shown in FIG. 14.

The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto.

What is claimed is:

1. A modular banner display system for an unmanned aerial vehicle comprising:
    A plurality of rigid tow scaffolds configured to be selectively coupled together, wherein the system is configured to form a plurality of tow scaffold configurations including configurations of a different quantity of tow scaffolds;
    A plurality of flexible rigging elements configured to form a plurality of harness configurations each used to couple a tow scaffold configuration to the unmanned aerial vehicle, wherein the plurality of harness configurations include at least one single line harness configuration and at least one double line harness configurations, wherein the system is less than 6 kg and wherein each rigid tow scaffold is a hollow tube.

2. The modular banner display system for an unmanned aerial vehicle according to claim 1 wherein the system is less than 2 kg.

3. The modular banner display system for an unmanned aerial vehicle according to claim 1 wherein each rigid tow scaffold measures about 12" long and is formed of one of aluminum or plastic.

4. The modular banner display system for an unmanned aerial vehicle according to claim 1 wherein each rigid tow scaffold has a plurality of thru-holes spaced at intervals along a length thereof.

5. The modular banner display system for an unmanned aerial vehicle according to claim 4 wherein the system includes a plurality of eye bolts and eye nuts, each eye bolt configured to be selectively received in any of the thru-holes of each tow scaffold to create coupling rings or eyelets.

6. The modular banner display system for an unmanned aerial vehicle according to claim 1 wherein each rigid tow scaffold includes a threaded post formed by a bushing insert within the tow scaffold at one end.

7. The modular banner display system for an unmanned aerial vehicle according to claim 6 wherein each rigid tow scaffold includes a threaded insert within the tow scaffold at the opposite end from the threaded post.

8. The modular banner display system for an unmanned aerial vehicle according to claim 1 wherein at least three tow scaffolds are provided and at least one tow scaffold configuration includes three coupled tow scaffolds.

9. The modular banner display system for an unmanned aerial vehicle according to claim 1 wherein the system includes a plurality of eye bolts and eye nuts, each eye bolt configured to be selectively received on each tow scaffold to create coupling rings or eyelets.

10. The modular banner display system for an unmanned aerial vehicle according to claim 1 wherein the system includes a plurality of carabiners.

11. The modular banner display system for an unmanned aerial vehicle according to claim 1 wherein a plurality of the flexible rigging elements are formed of nylon.

12. The modular banner display system for an unmanned aerial vehicle according to claim 1 wherein at least one flexible rigging element includes a coupling loop at least on one end thereof.

13. The modular banner display system for an unmanned aerial vehicle according to claim 1 wherein at least one flexible rigging element includes a swivel clip at least on one end thereof.

14. The modular banner display system for an unmanned aerial vehicle according to claim 1 wherein two identical length flexible rigging element terminate and share a common loop and a common swivel link at one end thereof and have separate loops and swivel links at the opposite ends thereof.

15. The modular banner display system for an unmanned aerial vehicle according to claim 14 wherein the flexible rigging elements that terminate and share a common loop and a common swivel link at one end thereof further includes a cinch mechanism that is configured to bring the rigging elements together at the cinch mechanism and the wherein the cinch mechanism is adjustable along the length of the rigging elements.

16. The modular banner display system for an unmanned aerial vehicle according to claim 14 wherein in at least one of the plurality of harness configurations is about 60" in length.

17. The modular banner display system for an unmanned aerial vehicle according to claim 1 wherein in each of the plurality of harness configurations an associated tow payload banner being carried is at least 18" from a base of the unmanned aerial vehicle to prevent interference between tow payload and the drone during take-off and landing of the drone.

18. A method of using a modular banner display system for an unmanned aerial vehicle comprising the steps of:
Providing a plurality of rigid tow scaffolds configured to be selectively coupled together, wherein the system is configured to form a plurality of tow scaffold configurations;
Forming one of the plurality of tow scaffold configurations using at least one of the rigid tow scaffolds;
Providing a plurality of flexible rigging elements configured to form a plurality of harness configurations each used to couple a tow scaffold configuration to the unmanned aerial vehicle, wherein the plurality of harness configurations include at least one single line harness configuration and at least one double line harness configurations; and
Forming one of the plurality of harness configurations using at least one of the flexible rigging elements; and
Coupling a banner to an unmanned aerial vehicle using the formed tow scaffold configuration and the formed harness configuration.

* * * * *